(12) United States Patent
Kurita

(10) Patent No.: US 9,683,625 B2
(45) Date of Patent: Jun. 20, 2017

(54) SHOCK ABSORBER

(71) Applicant: KYB Corporation, Tokyo (JP)

(72) Inventor: Norihiko Kurita, Gifu (JP)

(73) Assignee: KYB Corporation, Tokyo (JP)

(*) Notice: Subject to any disclaimer, the term of this patent is extended or adjusted under 35 U.S.C. 154(b) by 0 days.

(21) Appl. No.: 14/916,063

(22) PCT Filed: Sep. 3, 2014

(86) PCT No.: PCT/JP2014/073257
§ 371 (c)(1),
(2) Date: Mar. 2, 2016

(87) PCT Pub. No.: WO2015/037497
PCT Pub. Date: Mar. 19, 2015

(65) Prior Publication Data
US 2016/0215849 A1 Jul. 28, 2016

(30) Foreign Application Priority Data

Sep. 11, 2013 (JP) .................................. 2013-188366

(51) Int. Cl.
*F16F 9/512* (2006.01)
*F16F 9/50* (2006.01)
(Continued)

(52) U.S. Cl.
CPC .............. *F16F 9/512* (2013.01); *B62K 25/28* (2013.01); *F16F 9/19* (2013.01); *F16F 9/50* (2013.01);
(Continued)

(58) Field of Classification Search
CPC .... F16F 9/006; F16F 9/18; F16F 9/187; F16F 9/19; F16F 9/48; F16F 9/364;
(Continued)

(56) References Cited

U.S. PATENT DOCUMENTS 9,328,789 B2 * 5/2016 Ogawa .................... B61F 5/245
9,422,998 B2 * 8/2016 Ogawa ....................... F16F 9/48
(Continued)

FOREIGN PATENT DOCUMENTS

JP 2006-183864 A 7/2006
WO WO2013021963 * 2/2013

*Primary Examiner* — Vishal Sahni
(74) *Attorney, Agent, or Firm* — Rabin & Berdo, P.C.

(57) ABSTRACT

A shock absorber includes a piston joined to a piston rod that proceeds into and recedes from a cylinder, an extension-side chamber and a compression-side chamber that are separated from each other by the piston and have a working fluid reserved therein, first and second extension-side discharge passages in which the working fluid discharged from the extension-side chamber flows, an extension-side supply passage in which the working fluid to be supplied to the compression-side chamber flows, first and second compression-side discharge passages in which the working fluid discharged from the compression-side chamber flows, and a compression-side supply passage in which the working fluid to be supplied to the extension-side chamber flows. An extension-side damping valve and a compression-side damping valve are respectively provided in the first extension-side discharge passage and the first compression-side discharge passage. An extension-side electromagnetic pressure control valve and a compression-side electromagnetic pressure control valve, which are respectively provided in the second extension-side discharge passage and the second compression-side discharge passage, are set such that the openings thereof are maximized before the piston speed reaches a high-speed range.

4 Claims, 6 Drawing Sheets

(51) Int. Cl.
*B62K 25/28* (2006.01)
*F16F 9/19* (2006.01)
*F16F 9/516* (2006.01)

(52) U.S. Cl.
CPC ........ *F16F 9/5165* (2013.01); *F16F 2222/12* (2013.01); *F16F 2228/066* (2013.01)

(58) Field of Classification Search
CPC .......... F16F 9/5165; F16F 9/512; F16F 6/516; F16F 2222/12; F16F 2228/066; B62K 25/28; F15B 7/006; B61F 5/245
See application file for complete search history.

(56) References Cited

U.S. PATENT DOCUMENTS

| | | |
|---|---|---|
| 2006/0113834 A1 | 6/2006 | Hanawa |
| 2011/0192157 A1* | 8/2011 | Ogawa ................... B61F 5/245 60/469 |
| 2013/0248306 A1* | 9/2013 | Ogawa ...................... B61F 5/24 188/266.2 |
| 2014/0116826 A1* | 5/2014 | Ogawa ................... B61F 5/245 188/266.2 |

* cited by examiner

SHOCK ABSORBER

TECHNICAL FIELD

This invention relates to a shock absorber.

BACKGROUND ART

In general, a shock absorber damps vibration of a vehicle, a device, a structure, and the like. JP 2006-183864A discloses a shock absorber for damping vibration associated with the steering of a two-wheel vehicle. This shock absorber includes a tubular cylinder, a fluid chamber, a piston, piston rods, a flow channel, a tank, and a pressure control valve. The fluid chamber is formed inside the cylinder and filled with a working fluid. The piston partitions the fluid chamber into two compartments. The piston rods are provided on both sides of the piston. The two compartments communicate with each other via the flow channel. The tank is connected to an intermediate point of the flow channel and has the working fluid reserved therein. The pressure control valve is provided at an intermediate point of the flow channel. With this shock absorber, no matter which direction the piston moves in, control is performed so that the pressure in a contracted compartment acts as a valve opening pressure for the pressure control valve. As such, this shock absorber can produce a damping force caused by the resistance of the pressure control valve.

SUMMARY OF INVENTION

The pressure control valve of the shock absorber disclosed in JP 2006-183864A includes two valve elements that are arranged vertically in line, and one solenoid that adjusts the valve opening pressures for these valve elements simultaneously. The pressure in one compartment in the fluid chamber of the shock absorber acts on the valve element opposite to the solenoid, whereas the pressure in the other compartment acts on the valve element on the solenoid side. Therefore, when the piston moves toward one compartment, the two valve elements open simultaneously. On the other hand, when the piston moves toward the other compartment, only the valve element on the solenoid side opens.

However, with the shock absorber having the foregoing configuration, it is difficult to set a damping force separately for each one of the moving directions of the piston. For this reason, the shock absorber having the foregoing configuration is not suitable for use when a damping force needs to be set separately for each one of the moving directions of the piston, e.g., for a rear cushion that suspends a rear wheel of a two-wheel vehicle.

Furthermore, when the shock absorber having the foregoing configuration is applied to a two-wheel vehicle, there is a possibility that the ride quality of the vehicle is significantly impaired if malfunction occurs in a control device that controls the amount of electric current supplied to the solenoid at around the maximum output, where the piston moves to a large extent in one direction as a result of the shock absorber being subjected to a large impact.

It is an object of the present invention to enable a shock absorber to adjust a damping force separately for each one of the moving directions of a piston, and also to maintain a favorable ride quality of a vehicle by reliably producing a damping force at around the maximum output.

According to one aspect of the present invention, a shock absorber includes a tubular cylinder, a piston rod configure to proceed into and recede from the cylinder, a piston joined to the piston rod, an extension-side chamber and a compression-side chamber configured to be formed inside the cylinder, separated from each other by the piston, and filled with a working fluid, a tank arranged outside the cylinder and configured to have the working fluid reserved therein, and passages connecting between the extension-side chamber and the compression-side chamber, or between the cylinder and the tank. The passages include first and second extension-side discharge passages in which the working fluid discharged from the extension-side chamber flows, an extension-side supply passage in which the working fluid to be supplied to the compression-side chamber flows, first and second compression-side discharge passages in which the working fluid discharged from the compression-side chamber flows, and a compression-side supply passage in which the working fluid to be supplied to the extension-side chamber flows. The shock absorber further includes an extension-side damping valve provided in the first extension-side discharge passage and configured to apply predetermined resistance to the working fluid passing through the first extension-side discharge passage, an extension-side electromagnetic pressure control valve provided in the second extension-side discharge passage and configured to control a pressure in the extension-side chamber, a compression-side damping valve provided in the first compression-side discharge passage and configured to apply predetermined resistance to the working fluid passing through the first compression-side discharge passage, and a compression-side electromagnetic pressure control valve provided in the second compression-side discharge passage and configured to control a pressure in the compression-side chamber. The extension-side electromagnetic pressure control valve and the compression-side electromagnetic pressure control valve are set such that openings thereof are maximized before a piston speed reaches a high-speed range.

DESCRIPTION OF EMBODIMENTS

The following describes a shock absorber according to an embodiment of the present invention with reference to the drawings. Elements that are given the same reference sign throughout some drawings are the same as or equivalent to one another.

Figure 1:
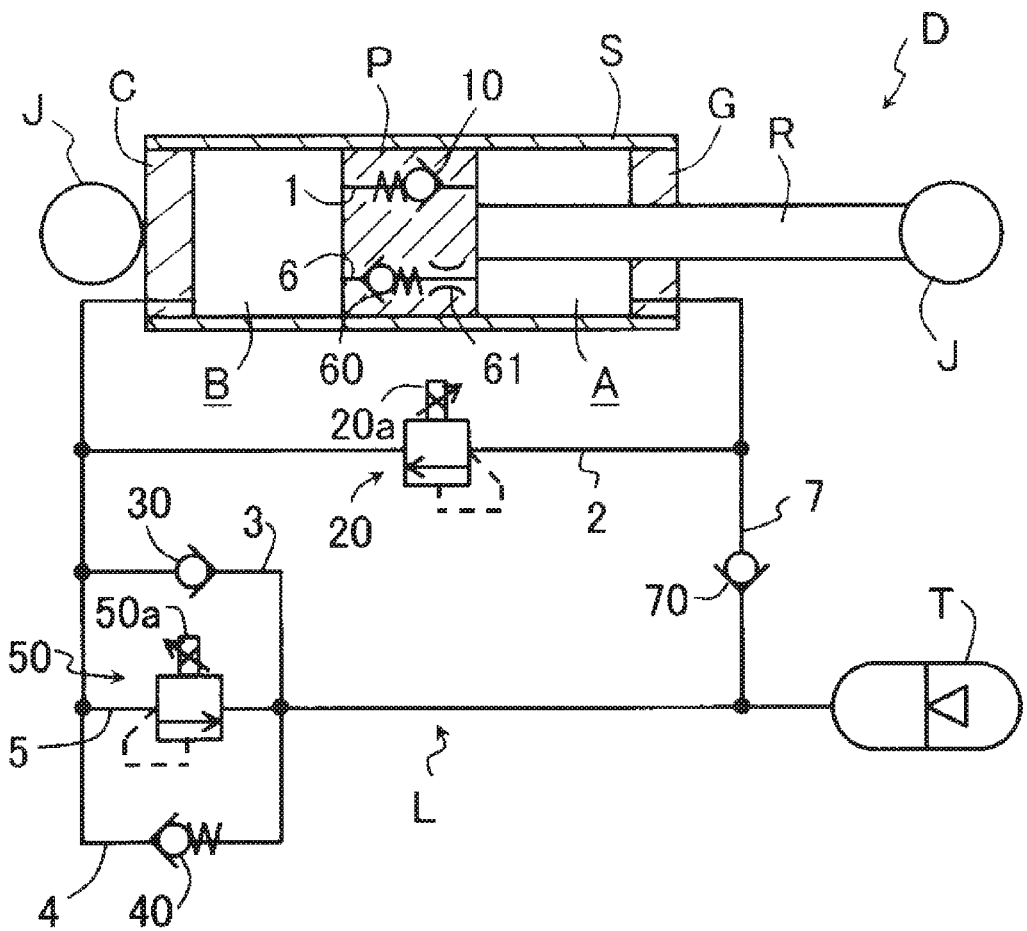
FIG. 1 shows a shock absorber according to an embodiment of the present invention.

A shock absorber D according to the present embodiment is used for a rear cushion that suspends a rear wheel of a straddled vehicle, such as a two-wheel vehicle and a three-wheel vehicle. As shown in FIG. 1, the shock absorber D includes a tubular cylinder S, a piston rod R, a piston P, an extension-side chamber A, a compression-side chamber B, a tank T, and passages L. The piston rod R proceeds into and recedes from the cylinder S. The piston P is joined to the piston rod R. The extension-side chamber A and the compression-side chamber B are formed inside the cylinder S, separated from each other by the piston P, and each filled with a working fluid. The tank T is arranged outside the cylinder S and has the working fluid reserved therein. The passages L connect between the extension-side chamber A and the compression-side chamber B, or between the cylinder S and the tank T. The passages L include first and second extension-side discharge passages 1, 2, an extension-side supply passage 3, first, second, and third compression-side discharge passages 4, 5, 6, and a compression-side supply passage 7. The working fluid discharged from the extension-side chamber A flows in the first and second extension-side discharge passages 1, 2. The working fluid to be supplied to the compression-side chamber B flows in the extension-side supply passage 3. The working fluid discharged from the compression-side chamber B flows in the first, second, and third compression-side discharge passages 4, 5, 6. The working fluid to be supplied to the extension-side chamber A flows in the compression-side supply passage 7.

The shock absorber D also includes an extension-side damping valve 10, an extension-side electromagnetic pressure control valve 20, a compression-side damping valve 40, and a compression-side electromagnetic pressure control valve 50. The extension-side damping valve 10 is provided in the first extension-side discharge passage 1 and applies predetermined resistance to the working fluid passing through the first extension-side discharge passage 1. The extension-side electromagnetic pressure control valve 20 is provided in the second extension-side discharge passage 2 and controls the pressure in the extension-side chamber A. The compression-side damping valve 40 is provided in the first compression-side discharge passage 4 and applies predetermined resistance to the working fluid passing through the first compression-side discharge passage 4. The compression-side electromagnetic pressure control valve 50 is provided in the second compression-side discharge passage 5 and controls the pressure in the compression-side chamber B. The extension-side electromagnetic pressure control valve 20 and the compression-side electromagnetic pressure control valve 50 are set such that the openings thereof are maximized (fully open) before the piston speed reaches a high-speed range.

One end of the tubular cylinder S is closed by a cap C, and an annular rod guide G is attached to the other end of the cylinder S. The piston rod R, which proceeds into and recedes from the cylinder S, is slidably inserted inside the rod guide G. Inside the cylinder S, one end portion of the piston rod R is joined to the piston P that is slidably inserted inside the cylinder S. The other end portion of the piston rod R projects outside the cylinder S. An unillustrated seal member seals between the outer periphery of the piston rod R and the rod guide G. Therefore, the inside of the cylinder S is maintained in a hermetically sealed state. The extension-side chamber A and the compression-side chamber B, which are separated from each other by the piston P, are filled with the working fluid. In the present embodiment, the working fluid is oil. However, the working fluid may be other types of liquids, such as water and water solution.

Attachments J are respectively mounted on the right end of the piston rod R in FIG. 1 and on the cap C closing the left end of the cylinder S in FIG. 1. One attachment J is joined to a frame, which is a framework of a vehicle body, while the other attachment J is joined to a swing arm that supports the rear wheel and is swingably attached to the frame. Therefore, when the rear wheel is subjected to an impact, the piston rod R enters the inside of the cylinder S.

The tank T is provided outside the cylinder S and has the working fluid reserved therein. The inside of the tank T is also filled with gas. In the present embodiment, the working fluid and the gas inside the tank T are separated from each other by a bladder, bellows, free piston, etc. The tank T compensates for a change in the volume of the working fluid caused by a temperature change, and for a change in the inner capacity of the cylinder S corresponding to the volume of the piston rod R that proceeds into and recedes from the cylinder S.

The extension-side chamber A and the compression-side chamber B that are separated from each other by the piston P, as well as the cylinder S and the tank T, communicate with each other via the passages L. The passages L are composed of the first and second extension-side discharge passages 1, 2, the extension-side supply passage 3, the first, second, and third compression-side discharge passages 4, 5, 6, and the compression-side supply passage 7. The working fluid discharged from the extension-side chamber A that is contracted during extension of the shock absorber D flows in the first and second extension-side discharge passages 1, 2. The working fluid to be supplied to the compression-side chamber B that expands during extension of the shock absorber D flows in the extension-side supply passage 3. The working fluid discharged from the compression-side chamber B that is contracted during compression of the shock absorber D flows in the first, second, and third compression-side discharge passages 4, 5, 6. The working fluid to be supplied to the extension-side chamber A that expands during compression of the shock absorber D flows in the compression-side supply passage 7. Among the passages L, the first extension-side discharge passage 1 and the third compression-side discharge passage 6 are arranged inside the cylinder S, while other passages 2, 3, 4, 5, 7 are arranged outside the cylinder S. The arrangements of the passages L are not limited in this way. All of the passages L may be arranged outside the cylinder S.

The first extension-side discharge passage 1 is provided in the piston P. The second extension-side discharge passage 2 is provided outside the cylinder S. The extension-side chamber A and the compression-side chamber B communicate with each other via the first and second extension-side discharge passages 1, 2. The first extension-side discharge passage 1 is provided with the extension-side damping valve 10 that permits the flow of the working fluid moving from the extension-side chamber A to the compression-side chamber B, prohibits the flow in the opposite direction, and applies predetermined resistance to the working fluid passing through the first extension-side discharge passage 1. The extension-side damping valve 10 is a passively-operated check valve subjected to a predetermined initial load. On the other hand, the second extension-side discharge passage 2 is provided with the extension-side electromagnetic pressure control valve 20 that includes a proportional solenoid 20*a* and controls the pressure in the extension-side chamber A.

An unillustrated control device is connected to the proportional solenoid 20*a*. The control device performs control so that the pressure in the extension-side chamber A matches a target pressure by changing the opening degree of the extension-side electromagnetic pressure control valve 20 through adjustment of the amount of electric current supplied to the proportional solenoid 20*a*. The extension-side electromagnetic pressure control valve 20 permits the flow of the working fluid moving from the extension-side chamber A to the compression-side chamber B, but prohibits the flow in the opposite direction. The extension-side electromagnetic pressure control valve 20 used here has a reasonably small capacity. The extension-side electromagnetic pressure control valve 20 is set such that the opening thereof is maximized (fully open) and the flow rate of the working fluid flowing in the second extension-side discharge passage 2 is saturated before the piston speed reaches the high-speed range.

The piston speed that maximizes the opening of the extension-side electromagnetic pressure control valve 20 can be changed as appropriate. For example, it is preferable that the piston speed that maximizes the opening of the extension-side electromagnetic pressure control valve 20 be set to 1 m/s to 1.5 m/s or lower when the shock absorber D is used for a rear cushion of an off-road vehicle, to 0.5 m/s to 0.8 m/s or lower when the shock absorber D is used for a rear cushion of an on-road vehicle, to 2 m/s to 3 m/s or lower when the shock absorber D is used for a front fork of an off-road vehicle, and to 1 m/s to 1.5 m/s or lower when the shock absorber D is used for a front fork of an on-road vehicle.

The first and second compression-side discharge passages 4, 5 are both provided outside the cylinder S. The compression-side chamber B and the tank T communicate with each other via the first and second compression-side discharge passages 4, 5. The first compression-side discharge passage 4 is provided with the compression-side damping valve 40 that permits the flow of the working fluid moving from the compression-side chamber B to the tank T, prohibits the flow in the opposite direction, and applies predetermined resistance to the working fluid passing through the first compression-side discharge passage 4. The compression-side damping valve 40 is a passively-operated check valve subjected to a predetermined initial load. On the other hand, the second compression-side discharge passage 5 is provided with the compression-side electromagnetic pressure control valve 50 that includes a proportional solenoid 50a and controls the pressure in the compression-side chamber B.

The unillustrated control device is connected to the proportional solenoid 50a. The control device performs control so that the pressure in the compression-side chamber B matches a target pressure by changing the opening degree of the compression-side electromagnetic pressure control valve 50 through adjustment of the amount of electric current supplied to the proportional solenoid 50a. The compression-side electromagnetic pressure control valve 50 permits the flow of the working fluid moving from the compression-side chamber B to the tank T, but prohibits the flow in the opposite direction. The compression-side electromagnetic pressure control valve 50 used here has a reasonably small capacity. The compression-side electromagnetic pressure control valve 50 is set such that the opening thereof is maximized (fully open) and the flow rate of the working fluid flowing in the second compression-side discharge passage 5 is saturated before the piston speed reaches the high-speed range.

The piston speed that maximizes the opening of the compression-side electromagnetic pressure control valve 50 can be changed as appropriate. For example, it is preferable that the piston speed that maximizes the opening of the compression-side electromagnetic pressure control valve 50 be set to 1.5 m/s to 2.3 m/s or lower when the shock absorber D is used for a rear cushion of an off-road vehicle, to 0.7 m/s to 1.2 m/s or lower when the shock absorber D is used for a rear cushion of an on-road vehicle, to 3 m/s to 4.5 m/s or lower when the shock absorber D is used for a front fork of an off-road vehicle, and to 1.5 m/s to 2.3 m/s or lower when the shock absorber D is used for a front fork of an on-road vehicle.

The third compression-side discharge passage 6 is provided in the piston P. The extension-side chamber A and the compression-side chamber B communicate with each other via the third compression-side discharge passage 6. The third compression-side discharge passage 6 is provided with a compression-side damping valve 60 that permits the flow of the working fluid moving from the compression-side chamber B to the extension-side chamber A, and prohibits the flow in the opposite direction. It is sufficient for the third compression-side discharge passage 6 to permit only the flow of the working fluid from the compression-side chamber B to the extension-side chamber A. Therefore, a valve provided in the third compression-side discharge passage 6 may be a check valve. However, in the present embodiment, as the third compression-side discharge passage 6 is provided in the piston P, it is difficult to install a large-capacity valve in the third compression-side discharge passage 6, and the valve applies resistance to the working fluid passing through the third compression-side discharge passage 6. For this reason, in FIG. 1, a valve provided at an intermediate point of the third compression-side discharge passage 6 is illustrated as the compression-side damping valve 60. Furthermore, when the opening of the compression-side damping valve 60 is maximized (fully open) with an increase in the piston speed, the shock absorber D produces a damping force with port characteristics for the case where the working fluid passes through the third compression-side discharge passage 6. Therefore, in FIG. 1, a throttle 61 is illustrated at an intermediate point of the third compression-side discharge passage 6.

The extension-side supply passage 3 is provided outside the cylinder S. The compression-side chamber B and the tank T communicate with each other via the extension-side supply passage 3. The extension-side supply passage 3 is provided with a check valve 30 that permits the flow of the working fluid moving from the tank T to the compression-side chamber B, and prohibits the flow in the opposite direction.

The compression-side supply passage 7 is provided outside the cylinder S. The extension-side chamber A and the tank T communicate with each other via the compression-side supply passage 7. The compression-side supply passage 7 is provided with a check valve 70 that permits the flow of the working fluid moving from the tank T to the extension-side chamber A, and prohibits the flow in the opposite direction.

A description is now given of the operations of the shock absorber D according to the present embodiment.

When the piston speed is in a low-speed range during extension of the shock absorber D where the piston rod R recedes from the cylinder S, the extension-side damping valve 10 does not open, and therefore the working fluid in the contracted extension-side chamber A moves to the expanding compression-side chamber B through the second extension-side discharge passage 2 by opening the extension-side electromagnetic pressure control valve 20. At the same time, the working fluid in the tank T corresponding to the volume of the piston rod R that has receded from the cylinder S moves from the tank T to the compression-side chamber B through the extension-side supply passage 3 by opening the check valve 30.

Figure 2:
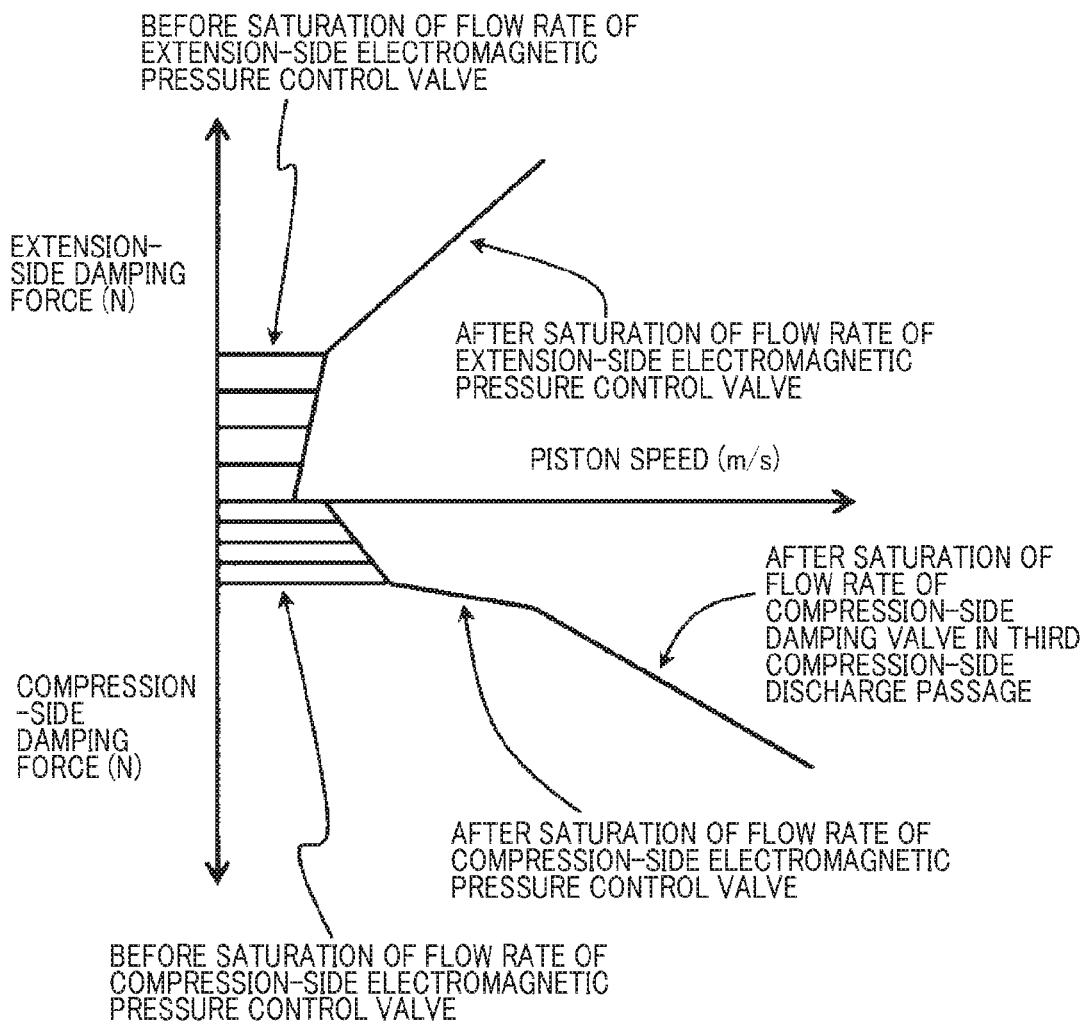
FIG. 2 shows damping force characteristics of the shock absorber shown in FIG. 1.

As the piston speed increases and reaches a medium-speed range during extension of the shock absorber D, the extension-side damping valve 10 opens. This enables the working fluid in the extension-side chamber A to move from the extension-side chamber A to the compression-side chamber B by passing through the first and second extension-side discharge passages 1, 2. A further increase in the piston speed will maximize the opening of the extension-side electromagnetic pressure control valve 20 (fully open) and saturate the flow rate before the piston speed reaches the high-speed range. That is to say, as shown in FIG. 2, until the opening of the extension-side electromagnetic pressure control valve 20 is maximized, the extension-side electromagnetic pressure control valve 20 can control the pressure in the extension-side chamber A to match a target pressure, and hence an extension-side damping force produced by the shock absorber D is substantially constant regardless of the piston speed. However, after the opening of the extension-side electromagnetic pressure control valve 20 is maximized, the extension-side electromagnetic pressure control valve 20 can no longer control the pressure in the extension-side chamber A. As a result, the extension-side damping force produced by the shock absorber D increases with an increase in the piston speed due to the resistance of the extension-side damping valve 10.

Conversely, during compression of the shock absorber D where the piston rod R proceeds into the cylinder S, the working fluid in the contracted compression-side chamber B moves to the expanding extension-side chamber A through the third compression-side discharge passage 6 by opening the compression-side damping valve 60. At the same time, the working fluid inside the tank T moves to the extension-side chamber A through the compression-side supply passage 7 by opening the check valve 70. Furthermore, when the piston speed is in the low-speed range during compression of the shock absorber D, the compression-side damping valve 40 does not open, and therefore the working fluid inside the compression-side chamber B corresponding to the volume of the piston rod R that has proceeded into the cylinder S moves to the tank T through the second compression-side discharge passage 5 by opening the compression-side electromagnetic pressure control valve 50.

As the piston speed increases and reaches the medium-speed range during compression of the shock absorber D, the compression-side damping valve 40 opens. This enables the working fluid in the compression-side chamber B to move from the compression-side chamber B to the tank T by passing through the first and second compression-side discharge passages 4, 5. A further increase in the piston speed will maximize the opening of the compression-side electromagnetic pressure control valve 50 (fully open) and saturate the flow rate before the piston speed reaches the high-speed range. That is to say, as shown in FIG. 2, until the opening of the compression-side electromagnetic pressure control valve 50 is maximized, the compression-side electromagnetic pressure control valve 50 can control the pressure in the compression-side chamber B to match a target pressure, and hence a compression-side damping force produced by the shock absorber D is substantially constant regardless of the piston speed. However, after the opening of the compression-side electromagnetic pressure control valve 50 is maximized, the compression-side electromagnetic pressure control valve 50 can no longer control the pressure in the compression-side chamber B. As a result, the compression-side damping force produced by the shock absorber D increases with an increase in the piston speed due to the resistance of the compression-side damping valves 40, 60.

Moreover, when the piston speed reaches the high-speed range during compression of the shock absorber D, the opening of the compression-side damping valve 60 provided in the third compression-side discharge passage 6 is maximized (fully open), and the flow rate is saturated. Therefore, after the opening of the compression-side damping valve 60 is maximized, the resistance of the third compression-side discharge passage 6, that is to say, the resistance of the throttle 61 increases a damping coefficient (a ratio of the amount of change in the damping force to the amount of change in the piston speed).

It should be noted that, while a piston speed range is divided into the low-speed range, the medium-speed range, and the high-speed range in the foregoing description, thresholds of the ranges can be set arbitrarily.

A description is now given of the operational effects of the shock absorber D according to the present embodiment.

In the present embodiment, the extension-side chamber A and the tank T communicate with each other via the compression-side supply passage 7.

Figure 3:
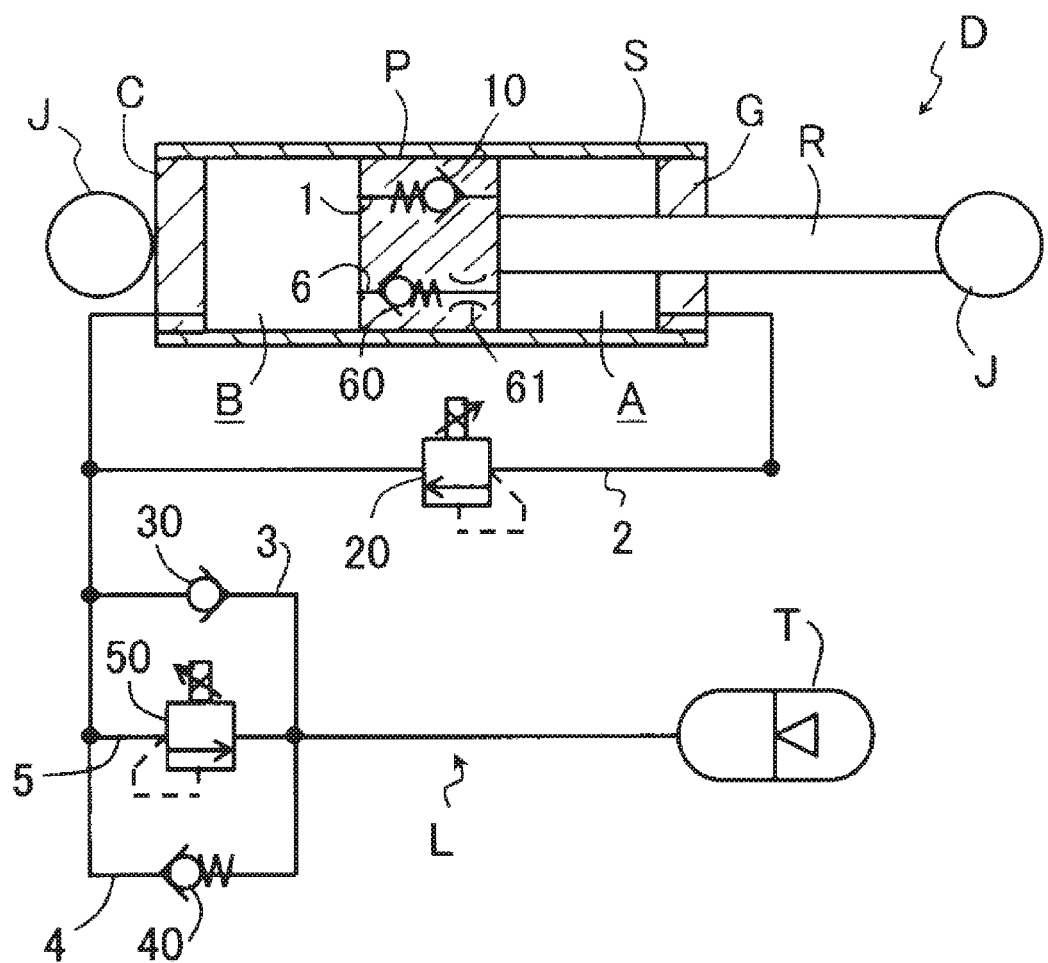
FIG. 3 shows a first modification example of the shock absorber according to the embodiment of the present invention.
Figure 4:
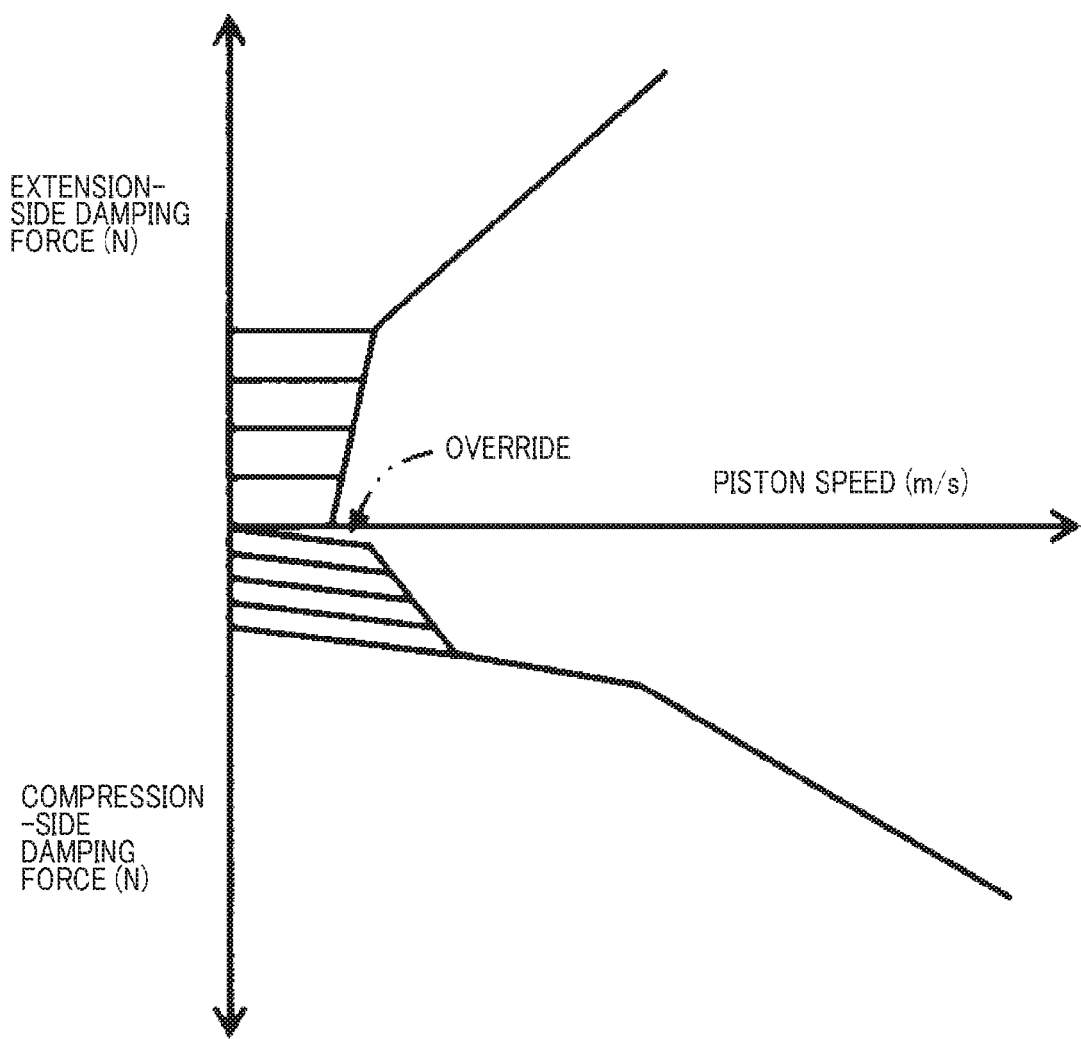
FIG. 4 shows damping force characteristics of the shock absorber shown in FIG. 3.

In the case where the third compression-side discharge passage 6 is provided via which the extension-side chamber A and the compression-side chamber B communicate with each other as in the present embodiment, the working fluid is supplied from the compression-side chamber B to the extension-side chamber A via the third compression-side discharge passage 6. This allows the third compression-side discharge passage 6 to function as a compression-side supply passage as well. However, as stated earlier, it is difficult to install a large-capacity valve in the third compression-side discharge passage 6 that is formed in the piston P. Therefore, in the case where the compression-side supply passage 7 is eliminated as shown in FIG. 3, the resistance associated with passing of the working fluid through the compression-side damping valve 60 in the third compression-side discharge passage 6 triggers the occurrence of an override in the compression-side damping force as shown in FIG. 4. As a result, the produced damping force is larger than the intended damping force. In contrast, by providing the compression-side supply passage 7 in the above-described manner so as to supply the working fluid to the expanding extension-side chamber A also from the compression-side supply passage 7 during compression of the shock absorber D, the shock absorber D can produce the intended compression-side damping force without the occurrence of the override in the compression-side damping force.

Furthermore, in the present embodiment, the extension-side chamber A and the compression-side chamber B communicate with each other via the first and second extension-side discharge passages 1, 2.

Figure 5:
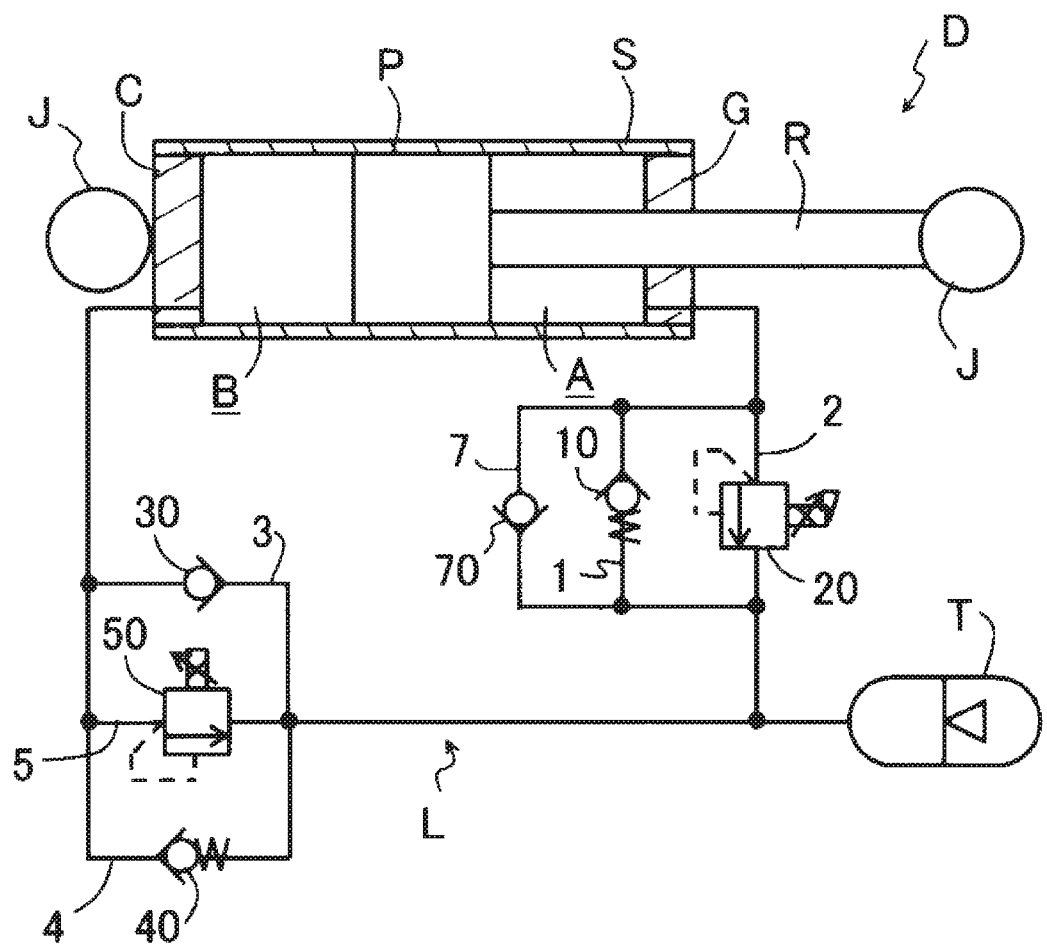
FIG. 5 shows a second modification example of the shock absorber according to the embodiment of the present invention.

In the case where the third compression-side discharge passage 6 is provided via which the extension-side chamber A and the compression-side chamber B communicate with each other and the resistance of the compression-side damping valve 60 is small as in the present embodiment, should the extension-side chamber A and the tank T communicate with each other via the first and second extension-side discharge passages 1, 2, the pressure in the extension-side chamber A becomes higher than the tank pressure during compression of the shock absorber D. As a result, the working fluid corresponding to the volume of the piston rod R that has proceeded into the cylinder S moves to the tank T by passing through the first and second discharge passages 1, 2. In contrast, the extension-side chamber A and the compression-side chamber B communicate with each other via the first and second extension-side discharge passages 1, 2 in the above-described manner. Accordingly, the working fluid can be prevented from passing through the first and second extension-side discharge passages 1, 2 during compression of the shock absorber D. In the case where the third compression-side discharge passage 6 is not provided, it is possible to adopt a configuration in which the extension-side chamber A and the tank T communicate with each other via the first and second extension-side discharge passages 1, 2 as shown in FIG. 5. In this configuration, the shock absorber D may be of a double-rod type where piston rods R are provided on both sides of the piston P.

In the present embodiment, the shock absorber D is of a single-rod type where the piston P is joined to one end portion of the piston rod R inside the cylinder S. Also, the compression-side chamber B and the tank T communicate with each other via the first and second compression-side discharge passages 4, 5, and the passages L include the third compression-side discharge passage 6 in which the working fluid discharged from the compression-side chamber B to the extension-side chamber A flows.

According to the foregoing configuration, the amount of the working fluid flowing in the first and second compression-side discharge passages 4, 5 corresponds to the volume of the piston rod R that proceeds into the cylinder S. Therefore, the flow rate of the working fluid passing through the compression-side damping valve 40 and the compression-side electromagnetic pressure control valve 50 is lowered, and the compression-side damping force can be reduced. With this configuration, even if the rear wheel is subjected to vibration from a violent upthrust (impact shock) as a result of, for example, a two-wheel vehicle running over a protrusion on a road surface, the shock absorber D does not produce an excessive compression-side damping force. Therefore, transmission of the vibration to the vehicle body can be reduced while effectively dissipating the impact shock.

Figure 6:
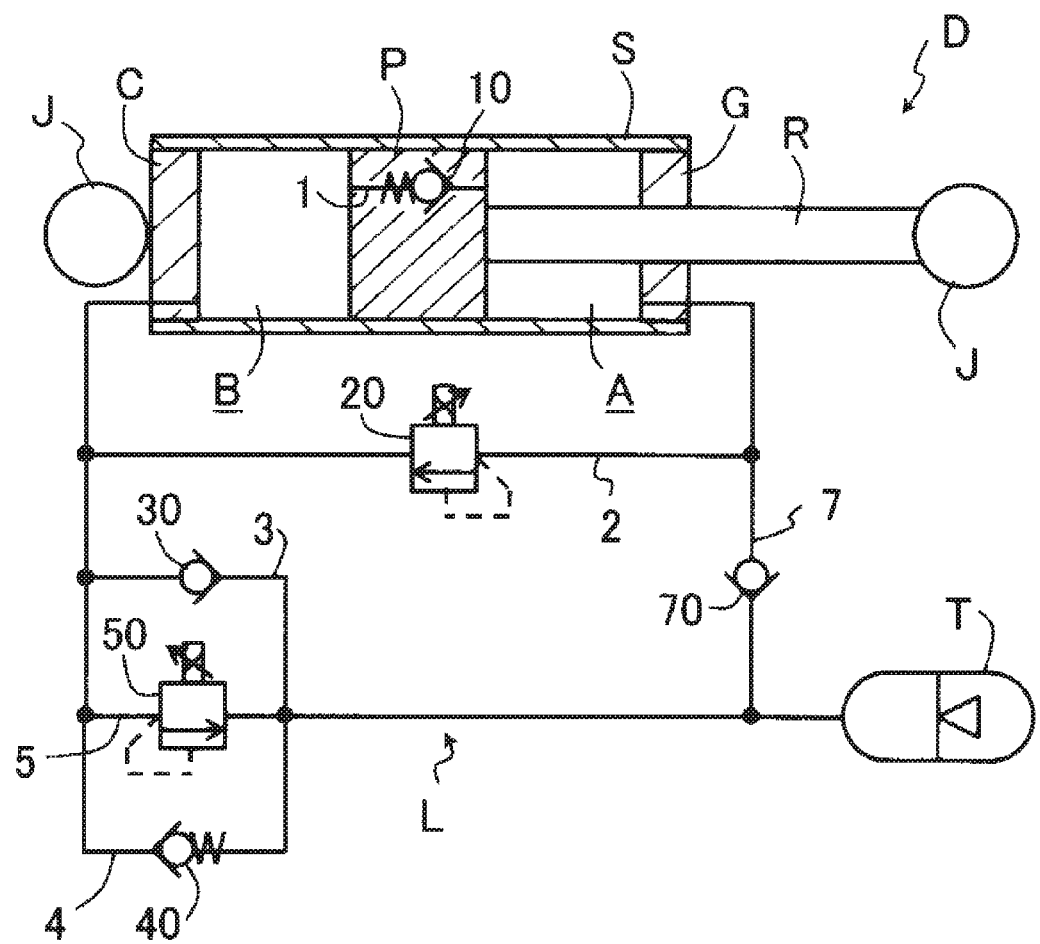
FIG. 6 shows a third modification example of the shock absorber according to the embodiment of the present invention.

It is possible to adopt a configuration in which the third compression-side discharge passage 6 is not provided as shown in FIG. 6. In this case, the working fluid corresponding to a product of the cross-section of the piston P and the distance by which the piston rod R has proceeded into the cylinder S flows in the first and second compression-side discharge passages 4, 5. Such an increase in the flow rate of the working fluid flowing in the first and second compression-side discharge passages 4, 5 makes it difficult to reduce the compression-side damping force. The same goes for the mode shown in FIG. 5. It should be noted that, in the mode shown in FIG. 6, among the passages L according to the present invention, the first extension-side discharge passage 1 is arranged inside the cylinder S, while other passages 2, 3, 4, 5, 7 are arranged outside the cylinder S. The arrangements of the passages L are not limited in this way. All of the passages L may be arranged outside the cylinder S.

Furthermore, in the present embodiment, the shock absorber D includes the tubular cylinder S, the piston rod R, the piston P, the extension-side chamber A, the compression-side chamber B, the tank T, and the passages L. The piston rod R proceeds into and recedes from the cylinder S. The piston P is joined to the piston rod R. The extension-side chamber A and the compression-side chamber B are formed inside the cylinder S, separated from each other by the piston P, and each filled with the working fluid. The tank T is arranged outside the cylinder S and has the working fluid reserved therein. The passages L connect between the extension-side chamber A and the compression-side chamber B, or between the cylinder S and the tank T. The passages L include the first and second extension-side discharge passages 1, 2, the extension-side supply passage 3, the first, second, and third compression-side discharge passages 4, 5, 6, and the compression-side supply passage 7. The working fluid discharged from the extension-side chamber A flows in the first and second extension-side discharge passages 1, 2. The working fluid to be supplied to the compression-side chamber B flows in the extension-side supply passage 3. The working fluid discharged from the compression-side chamber B flows in the first, second, and third compression-side discharge passages 4, 5, 6. The working fluid to be supplied to the extension-side chamber A flows in the compression-side supply passage 7.

The shock absorber D also includes the extension-side damping valve 10, the extension-side electromagnetic pressure control valve 20, the compression-side damping valve 40, and the compression-side electromagnetic pressure control valve 50. The extension-side damping valve 10 is provided in the first extension-side discharge passage 1 and applies predetermined resistance to the working fluid passing through the first extension-side discharge passage 1. The extension-side electromagnetic pressure control valve 20 is provided in the second extension-side discharge passage 2 and controls the pressure in the extension-side chamber A. The compression-side damping valve 40 is provided in the first compression-side discharge passage 4 and applies predetermined resistance to the working fluid passing through the first compression-side discharge passage 4. The compression-side electromagnetic pressure control valve 50 is provided in the second compression-side discharge passage 5 and controls the pressure in the compression-side chamber B. The extension-side electromagnetic pressure control valve 20 and the compression-side electromagnetic pressure control valve 50 are set such that the openings thereof are maximized (fully open) before the piston speed reaches the high-speed range.

According to the foregoing configuration, the extension-side electromagnetic pressure control valve 20 and the compression-side electromagnetic pressure control valve 50 are provided. Therefore, by separately controlling the amounts of electric current supplied to these valves, a damping force can be adjusted separately for the case where the piston P moves rightward in FIG. 1, and for the case where the piston P moves leftward in FIG. 1.

Furthermore, according to the foregoing configuration, the piston speed reaches the high-speed range and the openings of the extension-side electromagnetic pressure control valve 20 and the compression-side electromagnetic pressure control valve 50 are maximized at around the maximum output, where the piston P moves significantly in one direction as a result of the shock absorber D being subjected to a large impact. A damping force produced at around such maximum output is caused mainly by the resistance of the extension-side damping valve 10 and the compression-side damping valves 40, 60, which are passive valves. Therefore, even if malfunction occurs in the control device that controls the amounts of electric current supplied to the proportional solenoids 20a, 50a, a damping force is reliably produced at around the maximum output. This makes it possible to maintain a favorable ride quality of the vehicle.

The embodiments of the present invention described above are merely illustration of some application examples of the present invention and not of the nature to limit the technical scope of the present invention to the specific constructions of the above embodiments.

The present application claims a priority based on Japanese Patent Application No. 2013-188366 filed with the Japan Patent Office on Sep. 11, 2013, all the contents of which are hereby incorporated by reference.

The invention claimed is:

1. A shock absorber comprising:
a tubular cylinder; a piston rod configure to proceed into and recede from the cylinder; a piston joined to the piston rod;
an extension-side chamber and a compression-side chamber configured to be formed inside the cylinder, separated from each other by the piston, and filled with a working fluid;
a tank arranged outside the cylinder and configured to have the working fluid reserved therein;
passages connecting between the extension-side chamber and the compression-side chamber and between the cylinder and the tank,
the passages comprising:
first and second extension-side discharge passages in which the working fluid discharged from the extension-side chamber flows;
an extension-side supply passage in which the working fluid to be supplied to the compression-side chamber flows;
first and second compression-side discharge passages in which the working fluid discharged from the compression-side chamber flows; and
a compression-side supply passage in which the working fluid to be supplied to the extension-side chamber flows,
an extension-side damping valve provided in the first extension-side discharge passage and configured to apply predetermined resistance to the working fluid passing through the first extension-side discharge passage;
an extension-side electromagnetic pressure control valve provided in the second extension-side discharge passage and configured to control a pressure in the extension-side chamber;
a compression-side damping valve provided in the first compression-side discharge passage and configured to apply predetermined resistance to the working fluid passing through the first compression-side discharge passage; and
a compression-side electromagnetic pressure control valve provided in the second compression-side discharge passage and configured to control a pressure in the compression-side chamber,
wherein
the extension-side electromagnetic pressure control valve and the compression-side electromagnetic pressure control valve change an opening degree of the second extension-side discharge passage or an opening degree of the second compression-side discharge passage so that a pressure in the extension-side chamber or the compression-side chamber matches a predetermined constant target pressure when a piston speed is in a first speed range,
the extension-side electromagnetic pressure control valve and the compression-side electromagnetic pressure control valve are controlled so that the opening degree of the second extension-side discharge passage or the opening degree of the second compression-side discharge passage becomes maximum when the piston speed is in a second speed range set to a range faster than the first speed range,
the first extension-side discharge passage bypasses the extension-side electromagnetic control valve, and
the first compression-side discharge passage bypasses the compression-side electromagnetic control valve.

2. The shock absorber according to claim 1, wherein
the piston is joined to one end portion of the piston rod inside the cylinder,
the compression-side chamber and the tank communicate with each other via the first and second compression-side discharge passages, and
the passages include a third compression-side discharge passage in which the working fluid discharged from the compression-side chamber to the extension-side chamber flows.

3. The shock absorber according to claim 2, wherein
the extension-side chamber and the compression-side chamber communicate with each other via the first and second extension-side discharge passages.

4. The shock absorber according to claim 1, wherein
the extension-side chamber and the tank communicate with each other via the compression-side supply passage.

* * * * *